March 15, 1927.  1,620,727
A. S. HOWELL
PHOTOGRAPHIC CAMERA
Filed Aug. 12, 1925  2 Sheets-Sheet 1
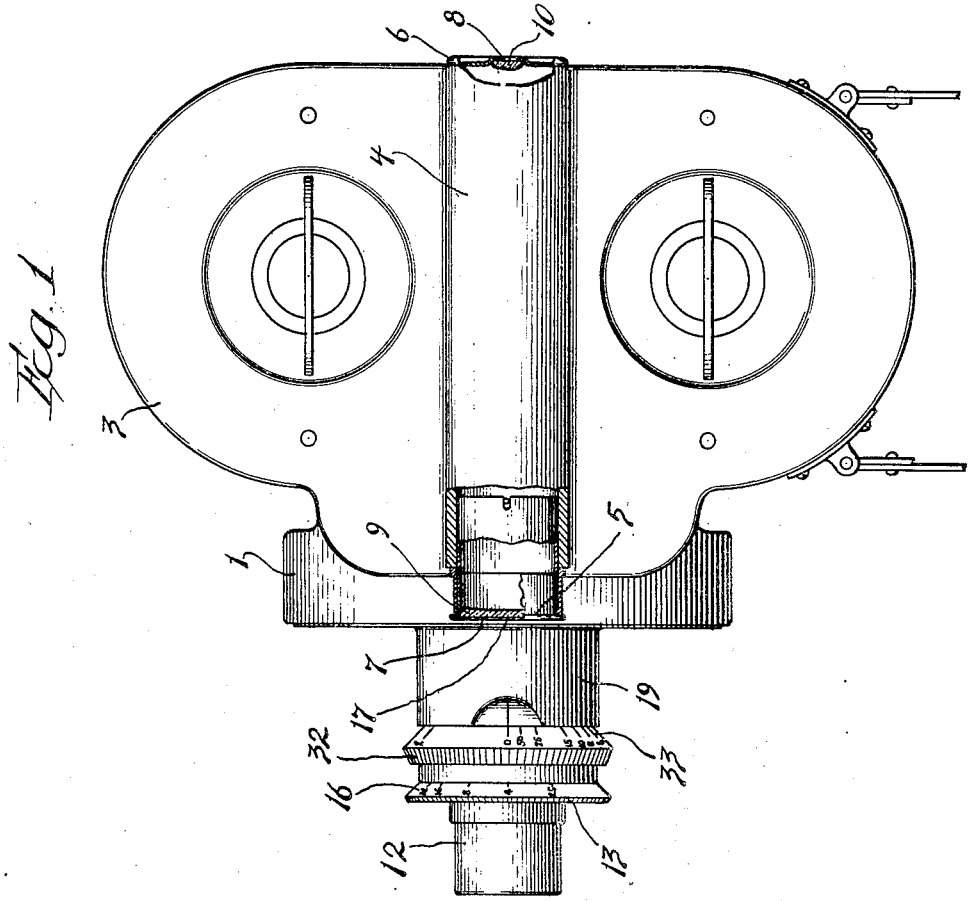
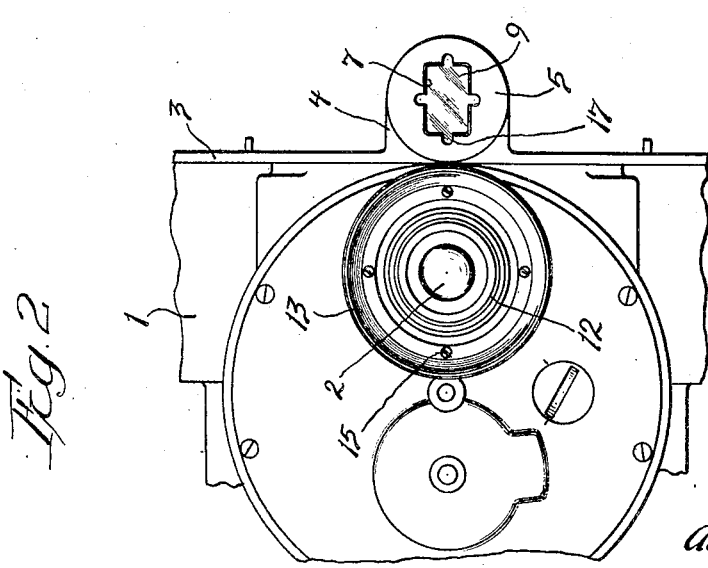
Inventor
Albert S. Howell
By Michle & Michle, Attys.

March 15, 1927.　　　　　A. S. HOWELL　　　　　1,620,727
PHOTOGRAPHIC CAMERA
Filed Aug. 12, 1925　　　　2 Sheets-Sheet 2
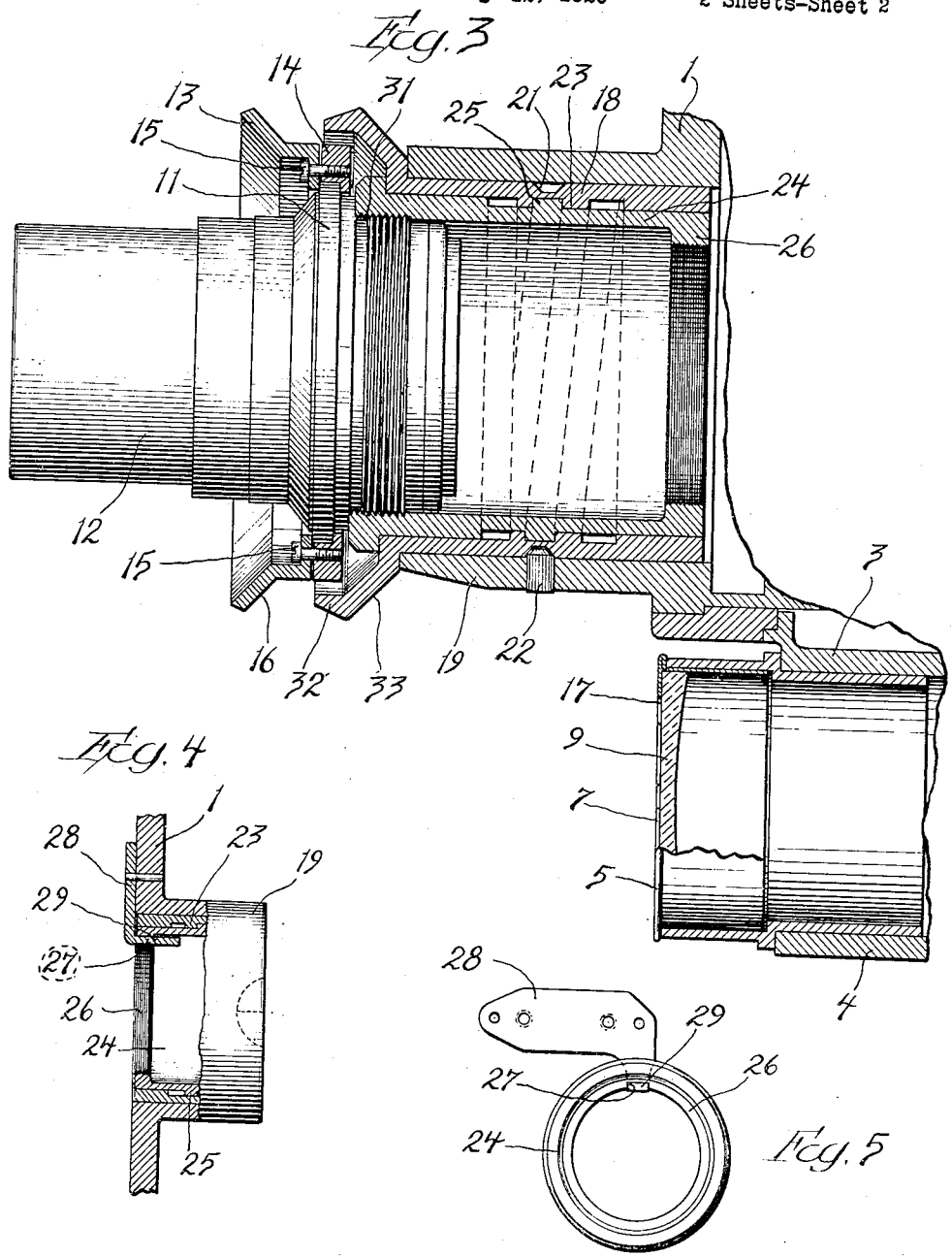
Inventor:
Albert S. Howell
By Miehle & Miehle, Attys.

Patented Mar. 15, 1927.

1,620,727

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

PHOTOGRAPHIC CAMERA.

Application filed August 12, 1925. Serial No. 49,772.

In my co-pending application for U. S. Letters Patent, Serial No. 707,203, filed April 17, 1924, for an improvement in a photographic camera, I described and claimed means with the photographic lens and view finder of a photographic camera by which the adjustment of the photographic lens is observable through the view finder, and specifically describing and claiming such a combination as relates to the adjustable iris mechanism of the photographic lens.

One of the objects of the present invention relates to the provision of a similar arrangement whereby the focal adjustment of the photographic lens is observable through the view finder with like advantages of greater ease and convenience in the use of the camera in that it permits the operator to observe and adjust the lens as to focus without movement of the camera or operator from their relative photographing positions in addition to acting as a constant reminder to the operator as to the focal adjustment of the lens while looking through the view finder.

A further object of this invention relates to the provision of a similar arrangement whereby the adjustments of the iris mechanism of the lens and of the lens for focusing the same may both be observed through the view finder with like advantages as to both adjustments.

A further object of this invention relates to the provision of a simple and effective arrangement of mounting the lens for focal adjustment whereby the mechanism for focusing the lens and the operation thereof does not interfere with a simple and effective arrangement whereby the adjustment of the iris mechanism is observed through the view finder.

With these objects in view my invention consists in certain features of novelty in the construction, combination, and arrangement of parts by which the said features and certain other features, hereinafter appearing, are effected, all as fully described with reference to the accompanying drawings and more particularly pointed out in the appended claims.

In the said drawings—

Figure 1 is a side elevation of a motion camera embodying my invention with parts broken away.

Figure 2 is a partial front elevation of the same.

Figure 3 is an enlarged partial central horizontal section of the same.

Figure 4 is a partial view of the lens mount structure with portions thereof broken away.

Figure 5 is a front elevation of the lens bushing and key in their assembled relation.

Like characters of reference indicate like parts in the several views.

Referring to the drawings 1 designates generally the case of the camera on the front of which and adjacent one side of the case is mounted a photographic lens 2 in a manner hereinafter described. The side of the case to which the lens is adjacent consists of a cover 3 which is detachable from the main portion of the case and integrally with which is formed an exterior view finder tube formation 4 disposed on an axis alongside and adjacent the focal axis of the lens. Mounted at the front and rear ends respectively of the finder tube formation are closure members 5 and 6, and the front closure member 5 forms a mask and the transverse wall thereof is provided with a centrally disposed rectangular opening 7 having two sides thereof disposed horizontally while the transverse wall of the rear closure member 6 is provided with a small centrally disposed aperture 8. Complementary lenses 9 and 10 are secured with suitable cement on the insides of the members 5 and 6 respectively, the lens 9 covering the entire inside surface of the transverse wall of the member 5. Thus is provided a view finder, the operator looking through the aperture 8 in using the same, and the arrangement is such that the aperture 7 substantially defines the photographic field of the lens 2.

The photographic lens 2 is adjustable for focusing by means of the mounting thereof, hereinafter described, and is provided with a usual adjustable iris mechanism which is adjusted by a usual external angularly movable cylindrical adjusting member 11 carried on the body 12 of the lens. See Fig. 3. A relatively large annular member 13 is clamped on the exposed forwardly facing surface of the member 11 for angular movement therewith on the axis of the lens 2 by means of an internally stepped ring 14 engaging the exposed rearwardly facing surface of the member 11 and headed screws 15 passing through holes in the member 13 and screw-threaded into the ring 14. The peripheral portion of the annular member 13 extends in a radial direction slantwise outwardly and forwardly and is provided on its rearwardly facing surface with an angularly extending scale 16 which is observable through the view finder at an additional opening 17 in the transverse wall portion of the member 5, which additional opening is in the form of a slot at the side of the opening 7 adjacent the lens 2, to determine the adjustment of the iris mechanism in an obvious manner. See Figs. 1 and 3. The scale 16 is observable through the view finder outside of the field of the lens 2 defined therein and at the portion of the opening 17 adjacent the opening 7. Thus the operator can observe at all times the adjustment of the iris mechanism and the iris mechanism can easily be adjusted by means of the member 13 without changing the position of the camera or interrupting the operator's vision through the view finder.

The photographic lens 2 is adjustable for focusing the same by means of the mounting thereof now to be described. See Figs. 3, 4, and 5. An adjusting bushing 18 is engaged for angular movement in the bore of a hub 19 on the case 1 of the camera, and is provided with an external circumferential groove 21 which is engaged by a stud 22 secured on the hub 19 to prevent axial movement of this bushing. The bushing 18 is provided with an internal screwthread 23, and a lens bushing 24 is provided with an external screwthread 25 which is engaged with the internal screwthread of the bushing 18 whereby the lens bushing is adjusted axially with relative angular movement of the bushing 18. The bushing 24 is provided at its rear end with an internal flange 26 through which is formed an axially extending key slot 27. A key member 28 is secured on the interior of the case 1 and is provided with a key 29 which projects forwardly into the bore of the lens bushing and slidably engages in the key slot 29 to prevent angular movement of the lens bushing. Thus angular movement of the adjusting bushing 18 causes axial movement of lens bushing 24. The lens bushing 24 is provided at its front end with an internal screwthread 31 into which the body 12 of the lens 2 is screwthreaded for securing the same thereon, the lens body being shouldered as is usual and clamping against the front end of the lens bushing. Thus angular adjustment of the adjusting bushing 18 effects axial adjustment of the lens 2 for focusing the same, and it will be observed that the lens does not move angularly in the focal adjustment thereof.

The adjusting bushing 18 is provided at its front end with an exterior flange 32 which extends as does the member 13 in a radial direction slantwise outwardly and forwardly adjacent and to the rear of the member 13. The flange 32 is provided on its rearwardly facing surface with an angularly extending scale 33 which is observable through the view finder at the additional opening 17 outside of the field of the lens 2 defined in the view finder to determine the focal adjustment of the lens, the scale 33 being observable at the portion of the opening 17 adjacent the lens 2, and the scale 16 being observable at the portion of the opening 17 adjacent the opening as hereinbefore described.

Thus both the focal adjustment of the lens 2 and the adjustment of the iris mechanism of the lens are observable through the view finder so that the operator may at all times observe both adjustments while looking through the view finder with consequent ease and convenience in the operation of the camera. The operator can easily adjust the iris mechanism and adjust the focus of the lens 2 by means of the member 13 and the flange 32 without changing the position of the camera or interrupting his vision through the view finder.

It will be observed that, by reason of the fact that the lens 2 does not move angularly in the focal adjustment thereof, the observation of the adjustment of the iris mechanism through the view finder by means of the simple and effective arrangement shown is not interfered with.

While I have described and shown the preferred embodiment of my invention I do not wish to be limited to the precise details of construction as changes may readily be made without departing from the spirit of my invention, but having thus described my invention I claim as new and desire to secure by Letters Patent the following:—

Claims:

1. In a photographic camera the combination with a photographic lens adjustable for focusing the same, of a view finder coordinated with the lens, and means indicating the focal adjustment of the photographic lens and adapted to be observed through the view finder as and for the purpose described.

2. In a photographic camera the combination with a photographic lens adjustable for focusing the same, of a view finder substantially defining the photographic field of the lens, and means indicating the focal adjustment of the lens and adapted to be observed through the view finder outside of the field of the photographic lens defined therein to determine the focal adjustment of the lens as and for the purpose described.

3. In a photographic camera the combination with a photographic lens adjustable for focusing the same, of a view finder arranged on an axis alongside and adjacent the focal axis of the lens and including a forwardly disposed mask provided with a rectangular opening substantially defining the photographic field of the lens and further provided with an additional opening in the form of a slot at the side of the rectangular opening adjacent the lens, and means indicating the focal adjustment of the lens and including a member mounted for angular movement substantially on the axis of the lens and provided with an indicating scale adapted to be observed through the view finder at said slot for indicating focal adjustment of the lens.

4. In a photographic camera the combination with a photographic lens adjustable for focusing the same and provided with an adjustable iris mechanism, of a view finder coordinated with the lens, means indicating focal adjustment of the lens, and means indicating adjustment of said iris mechanism, both of said indicating means being adapted to be observed through the view finder to determine both the focal adjustment of the lens and the adjustment of said iris mechanism.

5. In a photographic camera the combination with a photographic lens adjustable for focusing the same and provided with an adjustable iris mechanism, of a view finder arranged on an axis alongside and adjacent the focal axis of the lens and including a forwardly disposed mask provided with a rectangular opening substantially defining the photographic field of the lens and further provided with an additional opening in the form of a slot at the side of the rectangular opening adjacent the lens, means indicating focal adjustment of the lens, and means, indicating adjustment of the iris mechanism, each of said indicating means including a member mounted for angular movement on the axis of the lens and provided with an indicating scale adapted to be observed through the view finder at said slot for indicating the respective adjustment.

6. In a photograpic camera the combination with a photographic lens provided with an adjustable iris mechanism, of an adjusting member mounted on the camera for angular movement coaxially with the lens, a lens member upon which the lens is secured in coaxial relation therewith and having a coaxial screwthreaded engagement with said adjusting member, means preventing angular movement of the lens and said lens member and permitting axial movement thereof, a view finder coordinated with the lens, an indicating scale on said adjusting member for indicating focal adjustment of the lens, a member carried on the lens for angular movement on the axis of the lens and secured with said iris mechanism for angular movement in the adjustment of the iris mechanism and provided with an indicating scale for indicating adjustment of the iris mechanism, each of said scales being adapted to be observed through the view finder for determining the respective adjustment.

7. In a photographic camera the combination with a photographic lens provided with an adjustable iris mechanism, of an adjusting bushing mounted in a bore of the camera for angular movement and provided with an internal screwthread, a lens bushing upon which the photographic lens is secured in coaxial relation therewith and provided with an external screwthread engaged with the internal screwthread of said adjusting bushing, means preventing angular movement of the lens and lens bushing and permitting axial movement thereof, a view finder arranged on an axis alongside and adjacent the axis of the lens and substantially defining the photographic field of the lens, a flange on said adjusting member and provided with an indicating scale for indicating focal adjustment of the lens, and a second flange member carried by the lens for angular movement on the axis of the lens and secured with said iris mechanism for angular movement in the adjustment of the iris mechanism and provided with an indicating scale for indicating adjustment of said iris mechanism, each of said scales being adapted to be viewed through the view finder at the side of the field of the photographic lens defined therein adjacent the lens for indicating the respective adjustment.

8. In a photographic camera the combination with a photographic lens provided with an adjustable iris mechanism, of an adjusting bushing mounted in a bore of the camera for angular movement and provided with an internal screwthread, a lens bushing upon which the photographic lens is secured in coaxial relation therewith and provided with an external screwthread engaged with the internal screwthread of said adjusting bushing, means preventing angular movement of the lens and lens bushing and permitting axial movement thereof, a view finder arranged on an axis alongside and adjacent the axis of the lens and including a forwardly disposed mask provided with a rectangular opening substantially defining the photographic field of the lens and further provided with an additional opening in the form of a narrow slot at the side of the rectangular opening adjacent the lens, a forwardly disposed exterior laterally projecting flange on said adjusting bushing and provided with a rearwardly facing indicating scale for indicating focal adjustment of the lens, and a second exterior laterally projecting flange carried on the lens immediately forward of said first mentioned flange for angular movement on the axis of the lens and secured with said iris mechanism for angular movement in the adjustment of the iris mechanism and provided with a rearwardly facing indicating scale for indicating adjustment of the iris mechanism, each of said scales being adapted to be viewed through the view finder at said slot for determining the respective adjustment.

9. In a photographic camera the combination of an adjusting bushing engaged in a bore of the camera for angular movement and having an external circumferential groove and an internal screwthread, a stud secured on the camera and engaged in said groove for preventing axial movement of said bushing, a lens bushing provided with a forwardly disposed internal screwthread into which the body of a photographic lens is screwthreaded for securing the same thereon and further provided with an external screwthread engaged with the internal screwthread of said adjusting bushing and with a rearwardly disposed internal axially extending key slot, a key secured to the camera within the same and projecting forwardly into the bore of said lens bushing and slidably engaged in said key slot, a forwardly disposed exterior laterally projecting flange on said adjusting bushing whereby it may be manually adjusted angularly, and an indicating scale associated with said flange for determining focal adjustment of the lens as effected by angular adjustment of said adjusting bushing.

In witness whereof I hereunto affix my signature this 10th day of August, 1925.

ALBERT S. HOWELL.